United States Patent
Vanlaanen et al.

(10) Patent No.: US 8,000,049 B2
(45) Date of Patent: Aug. 16, 2011

(54) SELF-SERVO WRITING USING REFERENCE PATTERNS WITH TIMING CORRECTION

(75) Inventors: John W. Vanlaanen, Louisville, CO (US); Charles R. Watt, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1143 days.

(21) Appl. No.: 11/704,750

(22) Filed: Feb. 9, 2007

(65) Prior Publication Data

US 2007/0195445 A1 Aug. 23, 2007

Related U.S. Application Data

(60) Provisional application No. 60/772,473, filed on Feb. 10, 2006.

(51) Int. Cl.
*G11B 5/02* (2006.01)
(52) U.S. Cl. ........................................................ 360/51
(58) Field of Classification Search ........................ None
See application file for complete search history.

(56) References Cited

U.S. PATENT DOCUMENTS

| | | | |
|---|---|---|---|
| 4,208,674 A * | 6/1980 | Kuniyoshi et al. | 386/19 |
| 4,468,709 A * | 8/1984 | Kenjyo | 386/15 |
| 5,629,924 A * | 5/1997 | Yokogawa et al. | 369/275.3 |
| 5,740,152 A * | 4/1998 | Yokogawa et al. | 369/275.3 |
| 6,118,745 A * | 9/2000 | Hutchins et al. | 369/59.19 |
| 7,088,533 B1 | 8/2006 | Shepherd et al. | |
| 7,333,280 B1 * | 2/2008 | Lifchits et al. | 360/51 |

* cited by examiner

*Primary Examiner* — Daniell L Negron
*Assistant Examiner* — Huy Nguyen
(74) *Attorney, Agent, or Firm* — David K. Lucente

(57) ABSTRACT

Methods for writing servo fields on a rotatable data storage disk using reference patterns on the data storage disk include generating a clock signal, reading a reference pattern signal from a surface of the disk, generating a phase error signal in response to a phase offset between the clock signal and the reference pattern signal, subtracting a timing control value from the phase error to provide an adjusted phase error, generating a frequency control signal in response to the adjusted phase error, and adjusting the frequency of the clock signal. The timing control value is generated in response to the phase error signal and the frequency control signal.

17 Claims, 8 Drawing Sheets

SELF-SERVO WRITING USING REFERENCE PATTERNS WITH TIMING CORRECTION

RELATED APPLICATION

This application claims the benefit of and priority to U.S. Provisional Patent Application No. 60/772,473, filed Feb. 10, 2006, the disclosure of which is hereby incorporated herein by reference as if set forth in its entirety.

FIELD

The present invention generally relates to disk drives and disk drive manufacturing, and more particularly, to writing servo fields on a data storage disk of a disk drive using reference patterns, and related methods of making a disk drive.

BACKGROUND

Disk drives are commonly used in microprocessor based electronic devices, such as workstations, personal computers, laptops and other computer systems, to store and retrieve large amounts of data. A typical disk drive includes a plurality of magnetic disks that are rotated by a spindle motor and an actuator arm assembly that includes read/write heads mounted to flexure arms. An actuator motor (e.g., voice coil motor) can rotate the flexure arms and heads about a pivot bearing relative to the disks. The heads are configured to fly upon air bearings in very close proximity to the rotating disks.

The surface of each disk is divided into a series of data tracks which are spaced radially from one another across a band having an inner diameter and an outer diameter. The data tracks extend circumferentially around the disks and store data in the form of magnetic flux-transitions on the disk surfaces. Each data track is divided into a number of data sectors that store fixed sized blocks of user data. Embedded among the data sectors on each track are servo fields that define servo information that enables the disk drive to control the radial position of the heads relative to tracks on the disks and to determine the circumferential location of the heads.

The servo fields may be written to the disks during the manufacture of a disk drive using a highly precise servo track writer, which utilizes the heads of the disk drive to write the servo fields. Because the servo fields are used to define the radial locations of tracks and the location of data along a track, it is important to precisely control the locations on the disk surfaces at which the servo fields are written. Thus, a typical servo track writer includes a precise clock signal generator and an additional recording element that is used to write a reference clock pattern on a disk surface responsive to the clock signal. The reference clock pattern is then read back from the disk surface by the additional recording element to generate a disk reference clock signal synchronized to the rotation of the disks, which is used to determine where to write the servo fields through the read/write heads onto the disks.

Disk drives have been developed that self-servo write the servo patterns without a servo writer. For example, an incremental two-pass self-servo write process begins with a first pass that writes reference servo patterns at a position determined by a crash-stop (the mechanical limit of the head's movement) and then servos on the reference servo patterns and writes the next set of reference servo patterns. The first pass repeats as the head moves radially across the disk, with each step servoing on the previously written reference servo patterns to write the next reference servo patterns at the next radial position. During the first pass, the servo loop has no absolute reference to ensure placement of the reference servo patterns at the appropriate radius. After the first pass finishes the complete stroke, a second pass writes the final servo patterns using the reference servo patterns to find the appropriate positions. However, the second pass substantially increases the self-servo writing time.

In some disk drives, spiral patterns are written onto the disk, and the disk drive self-writes servo patterns on the disk using the spiral patterns as a reference for servoing the head. For example, 100-200 spirals may be written onto the surface of the disk. The spirals generally form an outwardly-expanding pattern from an inner diameter of the disk to an outer diameter of the disk. However, there may be small variations in the circumferential spacing of the spirals. Some aspects of these variations are predictable, however, because the variations repeat with each revolution of the disk. Such variations may cause the servo patterns to be written at incorrect locations on the disk. Accordingly, when self-writing the servo patterns on the disk, it is desirable to predict and account for these variations.

SUMMARY

Some embodiments provide methods for writing servo fields on a rotatable data storage disk using a phase locked loop that uses a phase error signal and a frequency control signal to control a phase of a clock signal generated by the phase locked loop. The methods include generating a timing control value in response to the phase error signal and the frequency control signal, and adjusting the phase error signal in response to the generated timing control value.

Adjusting the phase error signal may include subtracting the timing control value from the phase error signal to provide an adjusted phase error. The methods may further include generating a reference pattern signal in response to reference patterns on a surface of the data storage disk, generating the phase error signal in response to a phase offset between the clock signal and the reference pattern signal, generating a frequency control signal in response to the adjusted phase error, and adjusting the frequency of the clock signal in response to the frequency control signal.

The timing control value may include an average timing control value, and the methods may further include averaging the generated timing control value with a timing control value stored in a table of timing control values.

Generating the timing control value may include delaying the phase error signal, delaying the frequency control signal, and adding a current frequency control signal to the delayed phase error signal and the delayed frequency control signal to obtain a phase error estimate.

The methods may further include subtracting the phase error estimate from the phase error signal to obtain a differential timing control value, and integrating the differential timing control value to obtain the timing control value.

If a reference pattern on the disk is missed, the differential timing control value associated with the missed reference pattern may be set to zero. An expected phase error associated with the missed reference pattern may be calculated in response to a phase error for a previous reference pattern and frequency control signals associated with previous reference patterns. In some embodiments, if a reference pattern on the disk is missed, generating a differential timing control value associated with the missed reference pattern may be deferred until a subsequent reference pattern is detected on the disk.

The methods may further include reducing DC offset in the timing control value. In particular, generating the timing control value may include generating a differential timing control value in response to the phase error signal and the frequency control signal and integrating the differential timing control value. The methods may further include measuring DC offset in the timing control value, dividing the DC offset by a number of spokes on the disk to obtain an average DC offset, and subtracting the average DC offset from the differential timing control value.

The methods may further include delaying the frequency control signal, calculating a DC component of the frequency-control signal over one disk revolution; and subtracting the DC component from the frequency control signal to provide a DC-compensated frequency control signal. Generating differential timing control value may include generating differential timing control value in response the DC-compensated frequency control signal.

Generating the timing control value may include generating differential timing control value in response to the phase error signal and the frequency control signal and integrating the differential timing control value. The methods may further include delaying the generated timing control value, subtracting the delayed timing control value from a current timing control value to obtain a DC ramp value; dividing the DC ramp value by a number of spokes on the disk to obtain an average DC ramp, and subtracting the average DC ramp from the delayed timing control value.

The methods may further include calculating a DC offset value over one disk revolution, and subtracting the DC offset value from the delayed timing control value.

An apparatus for writing servo fields on a data storage media using reference patterns on the data storage media includes a phase locked loop and a servo controller. The phase locked loop includes a clock generator that generates a clock signal, a phase demodulator that generates a phase error signal in response to the clock signal and a reference pattern read signal, a combiner that subtracts a timing control value from the phase error signal to provide an adjusted phase error signal, and a controller that generates a frequency control signal in response to the adjusted phase error signal. The servo controller generates the timing control value in response to the phase error signal and the frequency control signal.

The timing control value may include an average timing control value, and the servo controller may be further configured to average the generated timing control value with a timing control value stored in a table of timing control values.

The servo controller may be further configured to multiply the generated timing control value by a first weight $K_{TCV}$ to obtain a first weighted value, multiply a timing control value stored in the table of timing control values by a second weight $1-K_{TCV}$ to obtain a second weighted value, to add the first and second weighted values, and to store the sum of the first and second weighted values in the timing control table.

The servo controller may be further configured to delay the phase error signal, to delay the frequency control signal, and to add a current frequency control signal to the delayed phase error signal and the delayed frequency control signal to obtain a phase error estimate.

The servo controller may be further configured to subtract the phase error estimate from the phase error signal to obtain a differential timing control value, and to integrate the differential timing control value to obtain the timing control value.

The data storage media may include a rotatable data storage disk, and the servo controller may be further configured to generate differential timing control value in response to the phase error signal and the frequency control signal, to integrate the differential timing control value to obtain the timing control value, to measure DC offset in the timing control value, to divide the DC offset by a number of spokes on the disk to obtain an average DC offset, and to subtract the average DC offset from the differential timing control value.

The servo controller may be further configured to delay the frequency control signal, to calculate a DC component of the frequency control signal over one disk revolution, to subtract the DC component from the frequency control signal to provide a DC-compensated frequency control signal, and to generate differential timing control value in response the DC-compensated frequency control signal.

In some embodiments, the servo controller may be configured to generate differential timing control value in response to the phase error signal and the frequency control signal, to integrate the differential timing control value, to delay the generated timing control value, to subtract the delayed timing control value from a current timing control value to obtain a DC ramp value, to divide the DC ramp value by a number of spokes on the disk to obtain an average DC ramp, to subtract the average DC ramp from the delayed timing control value to calculate a DC offset value in the timing control value over one disk revolution, and to subtract the DC offset value from the delayed timing control value.

DETAILED DESCRIPTION

The present invention now will be described more fully hereinafter with reference to the accompanying drawings, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings.

The present invention may be embodied in hardware and/or in software (including firmware, resident software, microcode, etc.). Consequently, as used herein, the term "signal" may take the form of a continuous waveform and/or discrete value(s), such as digital value(s) in a memory.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
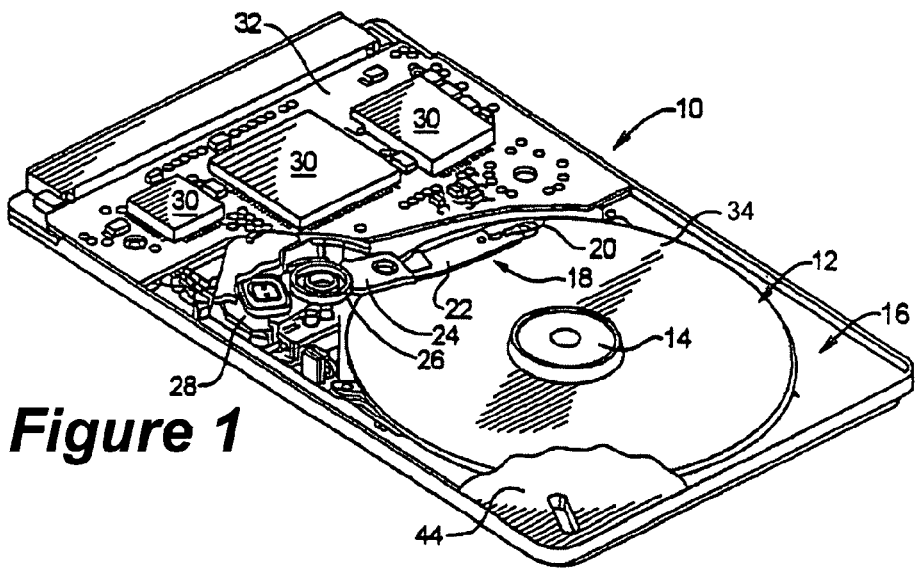
FIG. 1 is a perspective view of a disk drive with electronic circuits that are configured in accordance with some embodiments.
Figure 2:
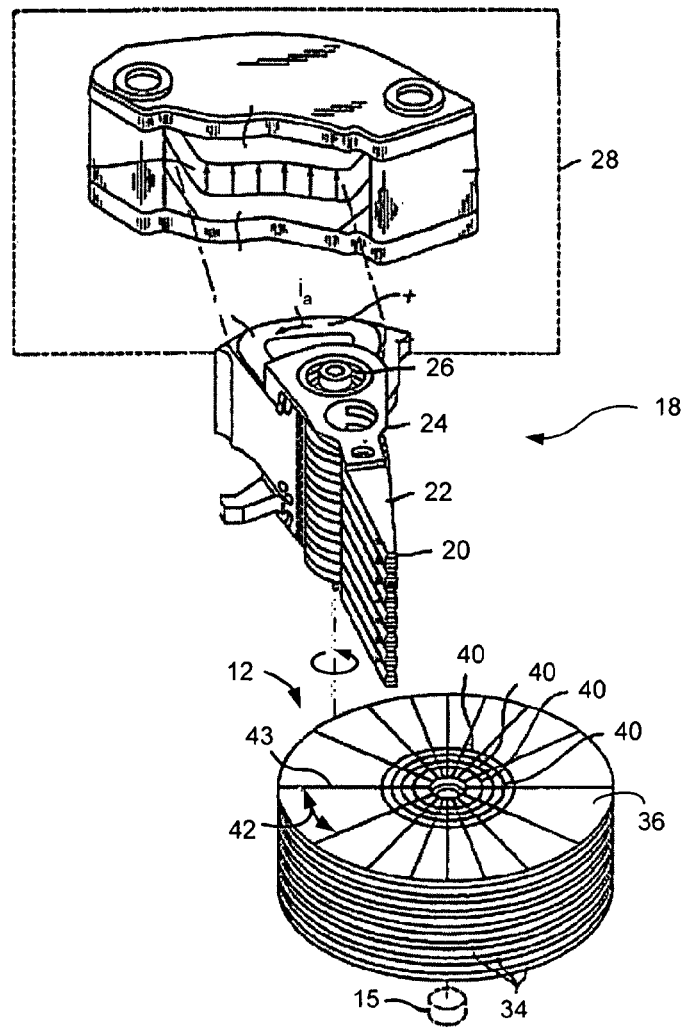
FIG. 2 is a block diagram of an exemplary head disk assembly of the disk drive.

A simplified diagrammatic representation of a disk drive, generally designated as 10, is illustrated in FIG. 1. The disk drive 10 includes a disk stack 12 (illustrated as a single disk 34 in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity.

The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of radially extending sectors 42 separated by radially extending spokes 43. Each sector is further divided into a servo sector and a data sector. The servo sectors of the disks 34 are used, among other things, to accurately position the head 20 so that data can be properly written onto and read from a selected one of the disks 34. The data sectors are where non-servo related data (i.e., host device data) is stored and retrieved.

Figure 3:
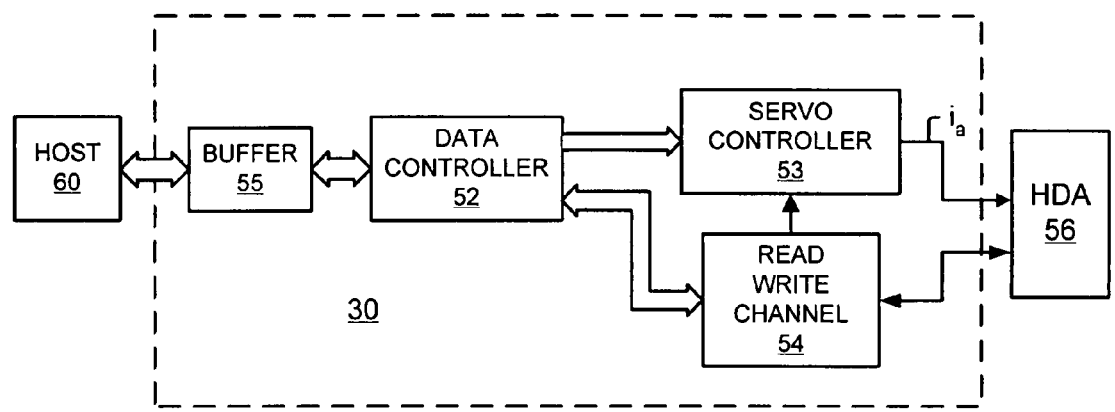
FIG. 3 is a block diagram of a portion of the controller of the disk drive shown in FIG. 1 and associated methods that are configured in accordance with some embodiments.

FIG. 3 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, and a buffer 55. Although the controllers 52, 53, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34, a plurality of the heads 20 mounted to the actuator arm assembly 18 and positioned adjacent to different data storage surfaces of the disks 34, the VCM 28, and the spindle motor 15.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34 by applying an actuator current signal $i_a$ to the VCM 28, and to maintain the head 20 aligned with the track while data is written/read on the disk 34.

Figure 4:
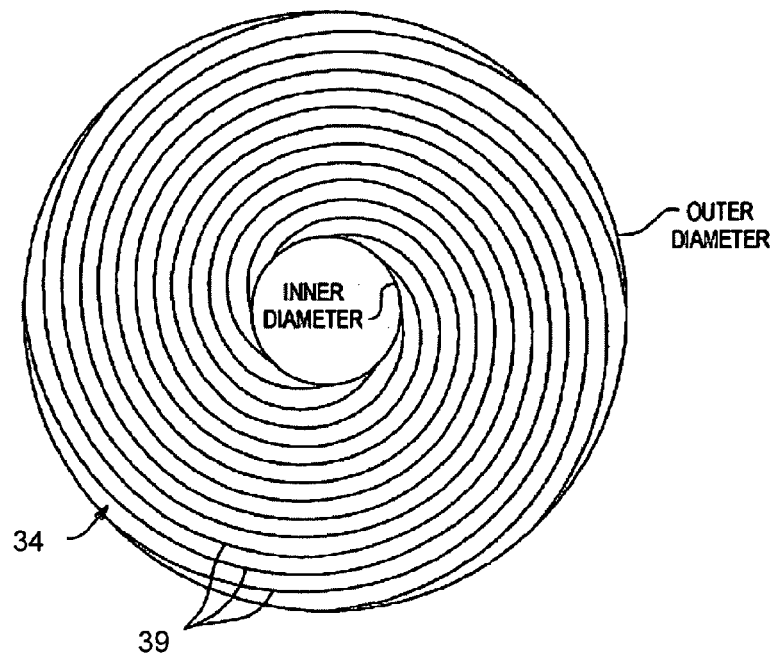
FIG. 4 shows a disk including spiral reference patterns.

As noted above, some disk drives are configured to write servo patterns on the disk 34 using spiral patterns 39 on the disk 34 as a reference for writing the servo patterns, as shown in FIG. 4. The spirals 39 generally form an outwardly-expanding pattern from an inner diameter of the disk 34 to an outer diameter of the disk 34. Using a phase-locked loop system, the output of a clock may be locked to spiral crossings to produced a disk-locked clock (DLC) with a frequency higher than a frequency of measured spiral crossings. The DLC may be used to write the servo patterns on the disk surface. However, there may be small variations in the circumferential spacing of the spirals, which may cause the servo patterns to be written at incorrect locations on the disk. Accordingly, when self-writing the servo patterns on the disk, it is desirable to predict and account for these variations.

Variations in spiral locations may be compensated at servo writing time by generating timing correction values (TCV) that may be used to correct phase errors in a disk-locked clock (DLC) that is synchronized to the spiral crossings. The timing correction value is a number that describes how any one individual spiral is displaced in time from an ideal location. The ideal time interval between spirals may be equal to the rotational time interval divided by the number of spirals on the disk.

TCV values may be calculated using a convolution-based system, in which average corrected phase errors are convolved with values contained in a TCV kernel. Because these calculations are complicated and must be performed continuously during servo writing, they are highly computationally intensive and demand a large amount of processing power. Moreover, because of the nature of the calculations involved, it is desirable to store the average phase error and the TCV kernel values in a tightly coupled memory, such as an on-board memory cache, that can be rapidly accessed by the processor. However, such memory may be expensive.

Figure 5:
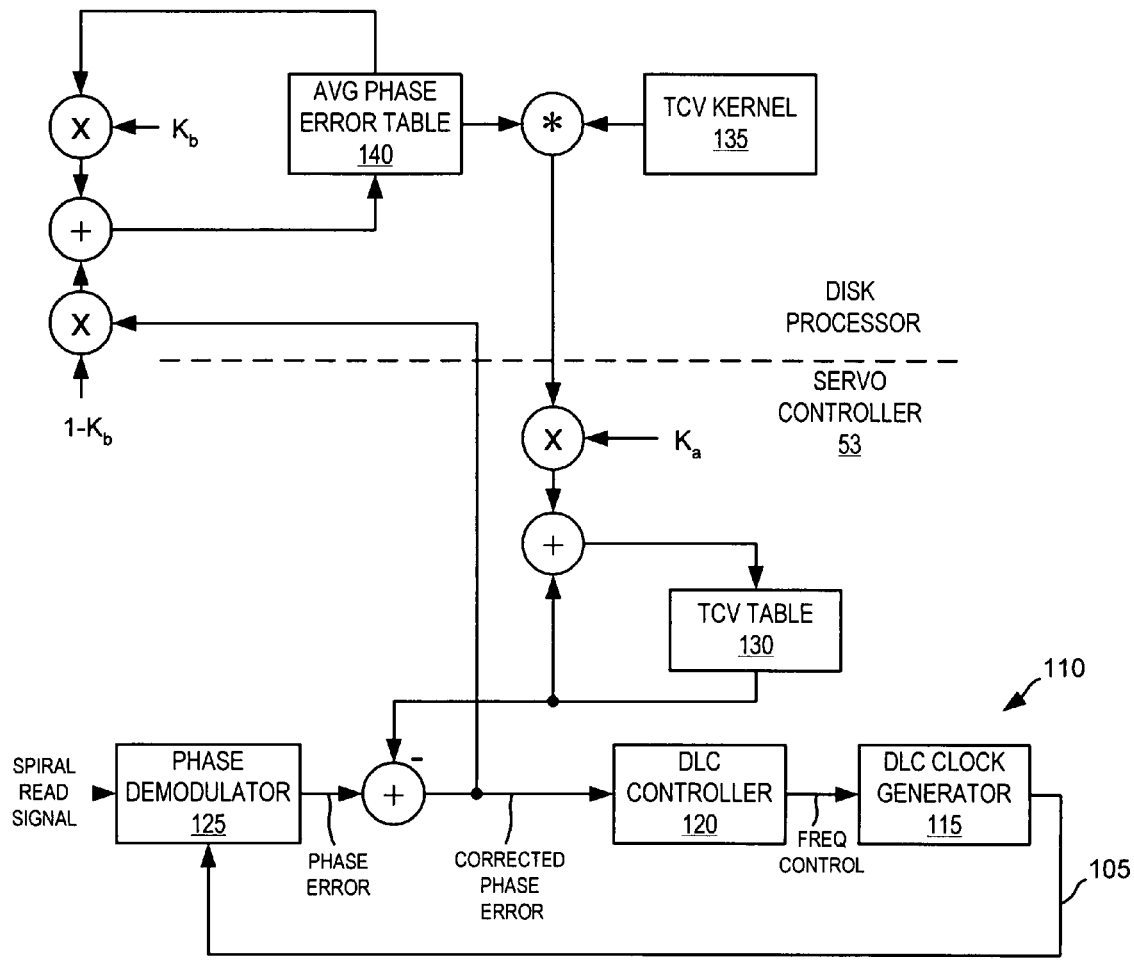
FIG. 5 is a block diagram illustrating systems/methods for compensating position errors in reference patterns during servo writing operations.

For example, timing correction values may be calculated using a convolution-based system as shown in FIG. 5. As shown therein, a disk-locked clock (DLC) 110 for use in writing servo patterns includes a DLC clock generator 115 that generates a clock signal 105 having a frequency that is controlled by a frequency control signal provided by a DLC controller 120. The frequency control signal may be determined in response to a phase error signal generated by a phase demodulator 125 in response to the clock signal and a spiral read signal from the read/write head 20 of the disk drive. In addition, the phase error is adjusted by subtracting TCVs output for each spiral by a TCV table 130. Timing control values are generated by convolving average phase errors output by the phase demodulator 125 with timing correction kernel values contained in a TCV kernel storage 135. The resulting values are multiplied by a weight $K_a$ before being added to the TCV table 130.

The corrected phase error, which is equal to the phase error output by the phase demodulator 125 less the timing correction value obtained from the TCV table 130, is used by the DLC controller 120 to determine a new value for the frequency control signal. Accordingly, servo patterns may be correctly written, even though the timing of spiral measurements may be displaced from ideal locations.

As shown in FIG. 5, the average phase errors used in the convolution operation may be obtained from an average phase error table 140. Average phase errors are obtained by taking the corrected phase error from the phase demodulator 125 for a particular spiral. The corrected phase error is multiplied by a weight $(1-K_b)$, while the existing average phase error for the spiral is multiplied by $K_b$. The results are summed and stored in the average phase error table 140 as the new average phase error.

Because the convolution calculations are highly computationally intensive and must be performed continuously during servo writing, they demand a large amount of processing power. Thus, as indicated in FIG. 5, the convolution operation may be performed in a separate processor from the servo controller 53. Moreover, because of the nature of the calculations involved, the average phase error table 140 and the TCV kernel 135 may require a large amount of a tightly coupled memory, such as an on-board memory cache or other zero-wait state memory that can be rapidly accessed by the processor.

Figure 6:
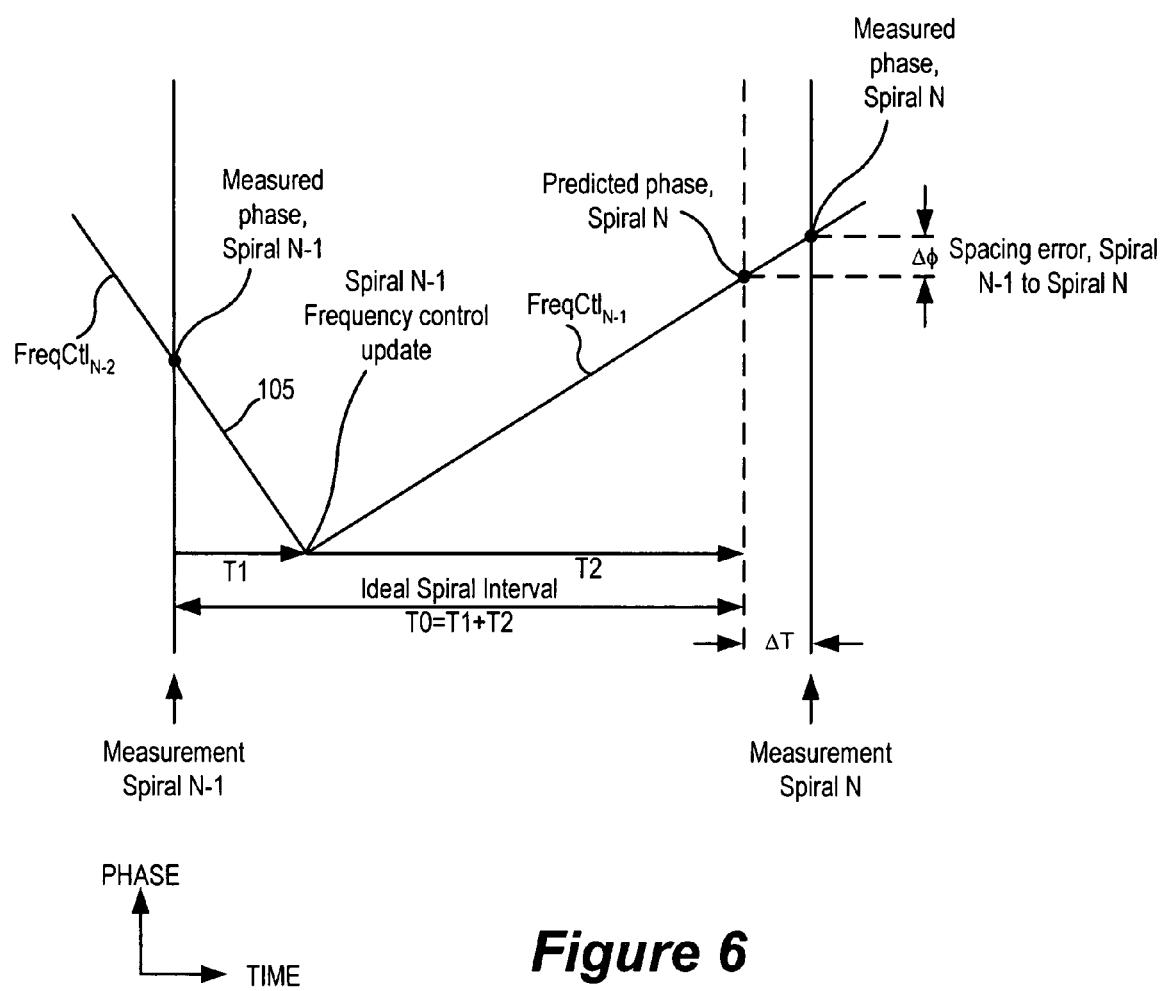
FIG. 6 is a graph illustrating sequential spiral measurements during servo writing operations.

The effect of phase errors in the spiral read signals is illustrated in FIG. 6, which is a graph of phase of the DLC clock signal 105 versus time. As illustrated in FIG. 6, the ideal spiral time interval is denoted T0. That is, after a spiral read signal is received, the servo controller 53 and the DLC 110 may expect to receive another spiral read signal in T0 seconds. For example, as shown in FIG. 6, after a signal for spiral N−1 is received, a signal for spiral N is predicted or expected to be received in T0 seconds.

As further illustrated in FIGS. 5 and 6, the phase of the DLC clock signal 105 when spiral N−1 is measured is decreasing in response to a frequency control signal FreqCtl$_{N-2}$ generated in response to the previous spiral phase measurement (spiral N−2). When the new phase measurement is performed at spiral N−1, a new frequency control signal FreqCtl$_{N-1}$ is generated by the DLC controller 120. In response, the phase of the DLC clock signal 105 begins to increase. The phase of the DLC clock signal 105 does not begin to change immediately after the measurement of spiral N−1, however. Due to processing lag, the phase of the DLC clock signal 105 begins to change after a time interval T1 following the measurement of spiral N−1.

Based on the new frequency control signal FreqCtl$_{N-1}$ generated in response to the measurement of the phase of spiral N−1, an expected phase of the next spiral (spiral N) may be determined as the phase of the DLC clock signal 105 at a time that is T0 seconds after the measurement of spiral N−1. However, as shown in FIG. 6, the actual measurement of spiral N may occur sometime before or after the time interval of T0 seconds following the measurement of spiral N−1. In the example shown in FIG. 6, the actual spiral measurement is delayed from the expected spiral measurement time by an amount ΔT. Thus, the actual measured phase of spiral N is displaced by an amount Δφ from the expected or predicted phase of spiral N.

Figure 7:
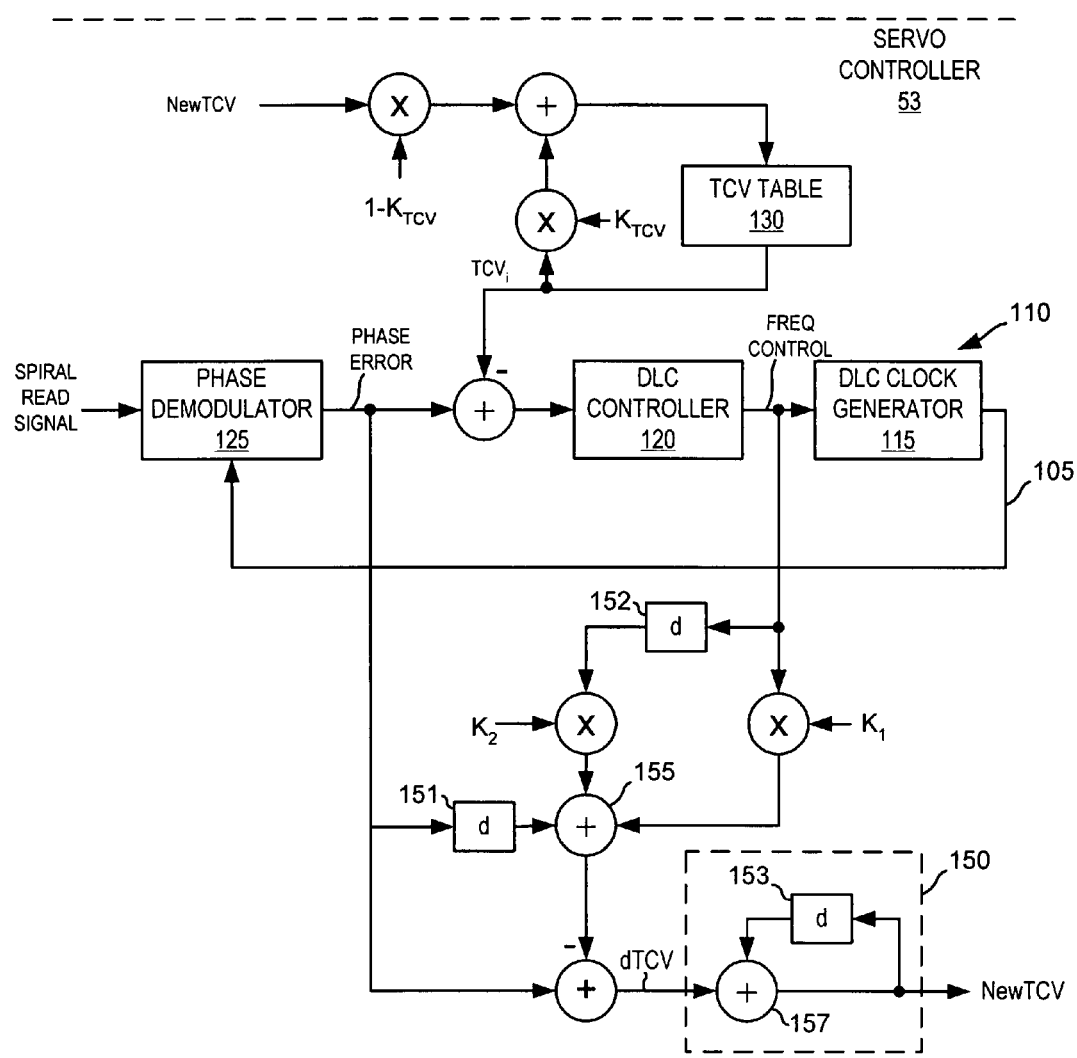
FIG. 7 is a block diagram illustrating systems/methods for compensating position errors in reference patterns during servo writing operations according to some embodiments.

Systems/methods for generating timing control values according to some embodiments are illustrated in FIG. 7. As shown in FIG. 7, systems/methods according to some embodiments may not use a convolution operation. Accordingly, the systems/methods may be implemented entirely within the servo controller 53, and/or may be implemented with reduced need for tightly coupled (zero wait state) memory.

As in the embodiments illustrated in FIG. 5, the servo controller 53 includes a disk-locked clock (DLC) 110 for use in writing servo patterns. The DLC 110 includes a DLC clock generator 115 that generates a clock signal 105 having a frequency that is controlled by a frequency control signal provided by a DLC controller 120. The frequency control signal may be determined in response to a phase error signal generated by a phase demodulator 125 in response to the clock signal and a spiral read signal from the read/write head 20 of the disk drive. In addition, the phase error is adjusted by subtracting timing control values TCV output for each spiral by a TCV table 130.

However, in the embodiments illustrated in FIG. 7, TCV values stored in the TCV table 130 are not generated via a convolution operation. Rather, the TCV values stored in the TCV table 130 are obtained by integrating differential TCV values (dTCV) in an integrator 150. A dTCV value is the difference in the position of a spiral relative to the position of the previous spiral. For example, if one spiral (e.g., spiral N) is measured at a time equal to T0+ΔT after the previous spiral (spiral N−1), then the spiral N has a dTCV value of ΔT. Thus, all dTCV values should add up to zero over a full disk revolution.

The calculated TCV values are filtered based on previous TCV values, and the filtered TCV values are stored in the TCV table 130. For example, the newly calculated TCV value for a given spiral is multiplied by a gain equal to $(1-K_{TCV})$ and added to the previous TCV value from the TCV table 130, which is multiplied by a gain equal to $K_{TCV}$. Thus, the TCV table 130 stores a weighted average TCV value in some embodiments.

The dTCV values are calculated based on the measured phase error for the current spiral less a quantity that represents an estimate of the phase error for the current spiral, and that is calculated in response to the frequency control effort of the current spiral along with the measured phase error and frequency control effort of the previous spiral. For example, as further illustrated in FIG. 7, the phase error detected for a given spiral is delayed by a first delay element 151. The frequency control signal for the spiral is also delayed by a second delay element 152. The frequency control signal is multiplied by a first weight $K_1$, while the delayed frequency control signal is multiplied by a second weight $K_2$. The delayed phase error, the frequency control signal, and the delayed frequency control signal are then summed in a combiner 155 to form the estimate of the phase error for the current spiral. The phase error estimate generated by the combiner 155 is subtracted from the phase error for the current spiral to obtain the value for dTCV for the current spiral.

The weights $K_1$ and $K_2$ can be calculated as follows. The change in frequency of the signal generated by the DLC clock generator 115 can be expressed as:

$$\Delta Frequency = K_F * FreqCtl \quad (1)$$

The total phase change accumulated over an interval T due to this frequency change can be expressed as:

$$\Delta Phase = \Delta Frequency * T = K_F * FreqCtl * T \quad (2)$$

Referring to FIG. 6, the change in phase over the T1 and T2 intervals can then be expressed as:

$$\Delta Phase1 = K_F * FreqCtl_{N-2} * T1 \quad (3)$$

$$\Delta Phase2 = K_F * FreqCtl_{N-1} * T2 \quad (4)$$

Since T1 and T2 are constants for a given design, the above equations can be reduced to:

$$\Delta Phase1 = K_1 * FreqCtl_{N-2} \quad (5)$$

$$\Delta Phase2 = K_2 * FreqCtl_{N-1} \quad (6)$$

Where:

$$K_1 = K_F * T1 \quad (7)$$

And $$K_2 = K_F * T2 \quad (8)$$

Accordingly, in some embodiments, the value for dTCV for a given spiral N may be calculated as:

$$dTCV(n) = \phi_e(n) - [\phi_e(n-1) + K_1 FrqCtl_N + K_2 FrqCtl_{N-1}] \quad (9)$$

where $\phi_e(n)$ represents the phase error for spiral n, and $FrqCtl_N$ represents the frequency control effort for spiral N.

As noted above, the values of dTCV are integrated in an integrator 150 to obtain the new TCV value for the current spiral. As shown in FIG. 7, the integrator may include a feedback loop including a delay element 153 and a combiner 157.

It will be appreciated that in systems and/or methods according to some embodiments, there may be no need to store a table including historical phase error values for each spiral measurement. Rather, only a single, filtered, TCV value may be stored for each spiral in the TCV table 130. Thus, substantially less memory may be required to implement systems and or methods according to some embodiments.

Moreover, some embodiments may not require averaging of phase error measurements. Furthermore, it has been observed that the estimate of the sample-to-correction delay T1 illustrated in FIG. 6 is not critical, and that systems/methods according to some embodiments may converge even if the delay of T1 is not considered, because the errors introduced thereby may be relatively small.

During the self-servo writing process, the read/write channel 54 of a disk drive may miss one or more spirals. Missing a spiral may occur for a number of reasons. For example, a servo pattern may fall on a spiral. Since it is not possible to both write and read at the same time, the spiral read may be missed while the servo field is being written. In case of a missed spiral, some embodiments provide policies for adjusting the frequency control signal output by the DLC controller 120.

Figure 8:
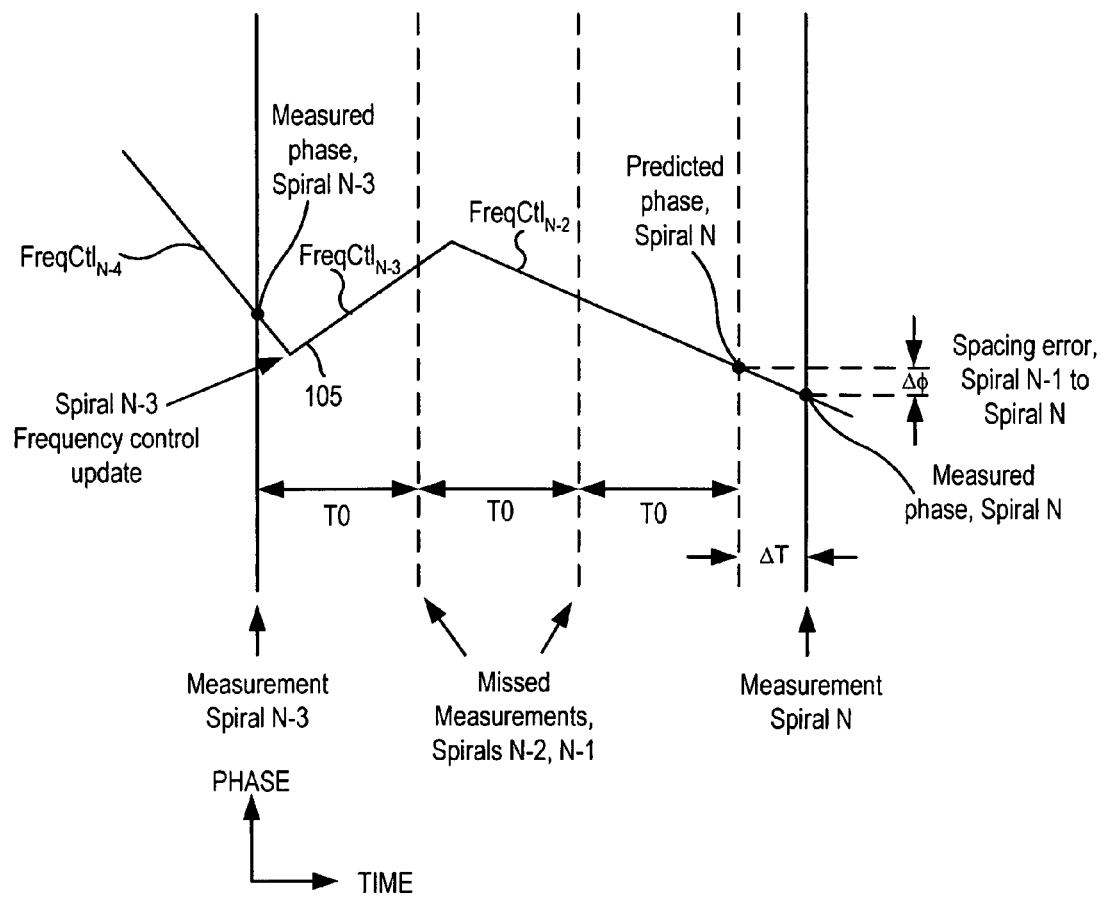
FIG. 8 is a graph illustrating sequential spiral measurements during servo writing operations including missed spiral measurements.

Some methods for handling missed spiral measurements are illustrated in FIG. 8. As shown therein, a spiral measurement is performed for spiral N−3. The measurements for the next two spirals (spirals N−2 and N−1) are missed, but the phase of spiral N is measured. In response to the measurement of the phase of spiral N−3, a frequency control signal $FreqCtl_{N-3}$ is generated by the DLC controller 120, causing the phase of the clock signal 105 output by the DLC clock generator 115 to increase. According to some embodiments, even though the next phase measurement (for spiral N−2) is missed, a new frequency control signal $FreqCtl_{N-2}$ may be output by the DLC controller 120, causing the phase of the clock signal 105 to decrease. The value of the new frequency control signal $FreqCtl_{N-2}$ may be selected, for example, as an approximation based on a history of control values applied at spiral N−2.

According to the policy, however, when the next spiral (spiral N−1) is missed, the DLC controller may not adjust the frequency control signal, but may continue to generate the frequency control signal $FreqCtl_{N-2}$ that was generated in response to the first missed measurement.

The generation of new TCV values when one or more spiral measurements are missed may be handled a number of ways, depending on the amount of complexity and/or accuracy desired. For example, in a first exemplary approach according to some embodiments, the dTCV value generated for a missing sample may be assumed to be zero. In that case, referring to FIG. 7, the TCV integrator 150 continues to run, and the TCV table 130 continues to be updated at every sample interval, including the missing ones. The calculation of the expected phase error may be updated at each missing sample based on the last measured phase and the intervening frequency control values, as follows:

Assuming that sample N is the last good sample, the expected phase for the subsequent samples N+1, N+2 and N+3 may be calculated as follows:

$$EX(N+1)=PE(N)+(FC(N-1)*K2)+(FC(N)*K1) \quad (10a)$$

$$EX(N+2)=EX(N+1)+(FC(N)*K2)+(FC(N+1)*K1) \quad (10b)$$

$$EX(N+3)=EX(N+2)+(FC(N+1)*K2)+(FC(N+2)*K1) \quad (10c)$$

where EX(j) represents the expected phase error for sample j, FC(j) represents the frequency control value for sample j, and PE(j) represents the measured phase error for sample j. A general equation for calculating the ith missing sample (where i>=2) is as follows:

$$EX(N+i)=EX(N+i-1)+(FC(N+i-2)*K2)+(FC(N+i-1)*K1) \quad (11)$$

According to the first exemplary approach, on the first good sample following one or more missed samples, the dTCV value for the good sample is calculated from the difference between the new measured phase and the expected value calculated above.

In a second exemplary approach, the dTCV values may not be calculated for missing samples at the time of the missing sample. Instead, calculation of dTCV values may be deferred until the first good sample arrives. The TCV integrator 150 may not run and the TCV table 130 may not be updated for the missing samples until the deferred dTCV calculations are done following the first good sample. The calculation of the expected error for each missing sample may be updated each missing sample as in the first exemplary approach.

According to the second exemplary approach, on the first good sample following one or more missing samples, the total phase error is calculated by differencing the expected phase (calculated as above) and the new measured phase. Estimates of the phase error for the current sample and each of the preceding missing samples may then be calculated by dividing this new total phase error by the number of previous missing samples plus 1.

The dTCV values for each preceding missing sample and the current good sample may then be calculated using their portion of the measured total phase error (calculated as above) and the above-calculated phase error estimate for that sample. As each intervening dTCV value is calculated, the TCV integrator 150 can run and the TCV table 130 can be updated.

It will be appreciated that the first exemplary approach may be simpler to implement, but may allocate all the phase error accumulated up to the first good sample to that sample itself. The second exemplary approach addresses this issue, but may be more complex to implement. In particular, in the second exemplary approach, the total measured phase error may be distributed over all of the missing samples. Extra calculations may be run when the first good sample arrives in order to obtain the missing dTCV and TCV values.

It will be appreciated that the values of dTCV should sum to zero over one full rotation of the disk 34. However because there may be some DC offset present in the calculated dTCV values, the integration of dTCV values may be nonzero. If the DC offset is not compensated, the output of the integrator 150 could become unstable.

DC offset may arise due to a number of sources, including for example, variations in the rotational speed of the spindle and/or truncation/quantization errors. DC offset that is present either in the measured phase or the frequency control values may cause a ramp in the calculated TCV values. This may cause the TCV values to change significantly from one disk revolution to the next. DC offset in the TCV values causes a static phase offset that can result in radial incoherence if it changes over time:

In order to address DC offset in the TCV values, it may be desirable to remove or reduce DC offset in the frequency control input. In order to reduce DC offset, phase, frequency control and missing sample data may be delayed by one revolution before it is used. The DC content of the frequency control input may be calculated once per disk revolution and removed from the frequency control. In some embodiments, the DC content of the measured phase may not be removed. It is assumed that the DLC integrator may remove most of the DC content of the phase measurement.

Figure 9:
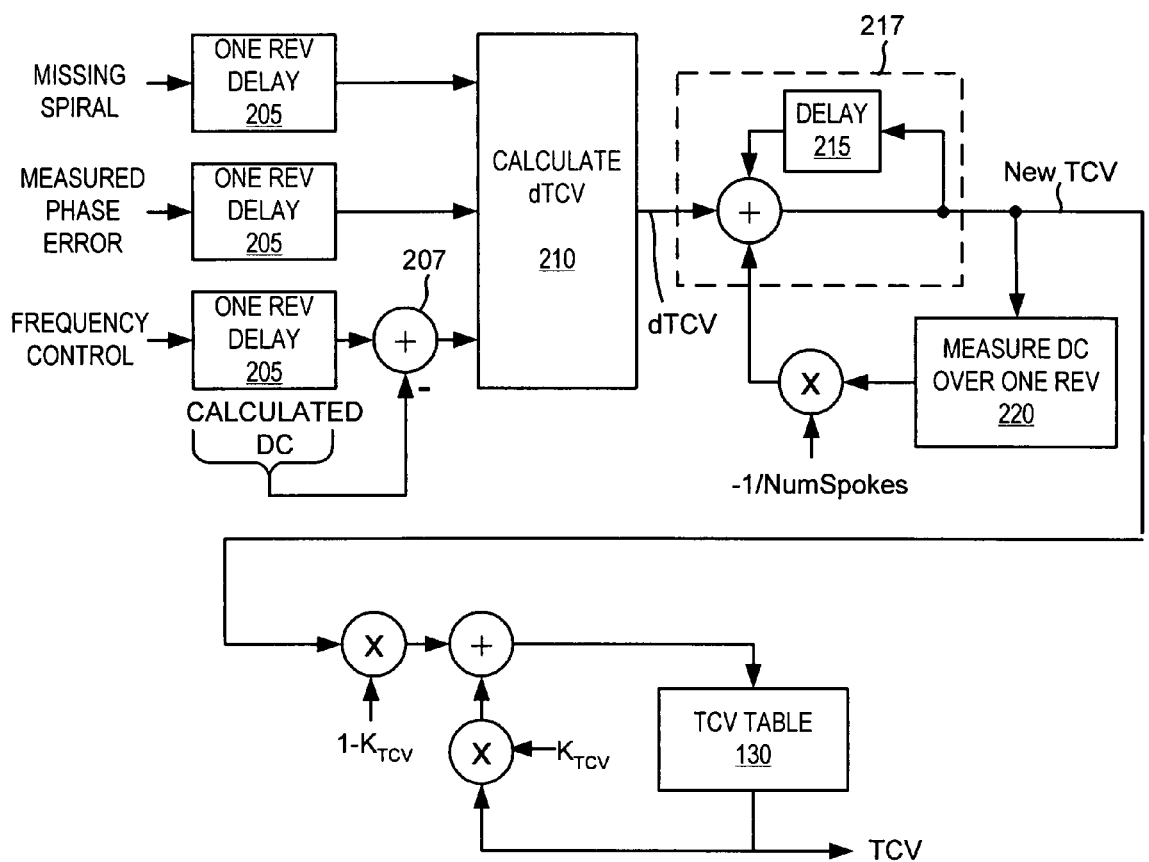
FIGS. 9 and 10 are block diagrams illustrating systems/methods for removing DC offset from timing correction values during servo writing operations according to some embodiments.

Systems/methods for reducing DC offset according to some embodiments are illustrated in FIG. 9. As shown therein, missing spiral data, measured phase error data and frequency control data are delayed by one revolution by delay blocks 205. Measured DC offset is subtracted from the frequency control data once per revolution, as indicated by the subtraction node 207. The delayed data is then used to calculate dTCV values (Block 210). The dTCV values are integrated in an integrator 217 to form the TCV values. DC in the TCV values is measured once per disk revolution (Block 220). The total DC in the TCV values is divided by the number of spokes and subtracted from the dTCV values in the integrator 217. The DC-corrected TCV values are filtered and stored in the TCV table 130, used as provided above.

Figure 10:
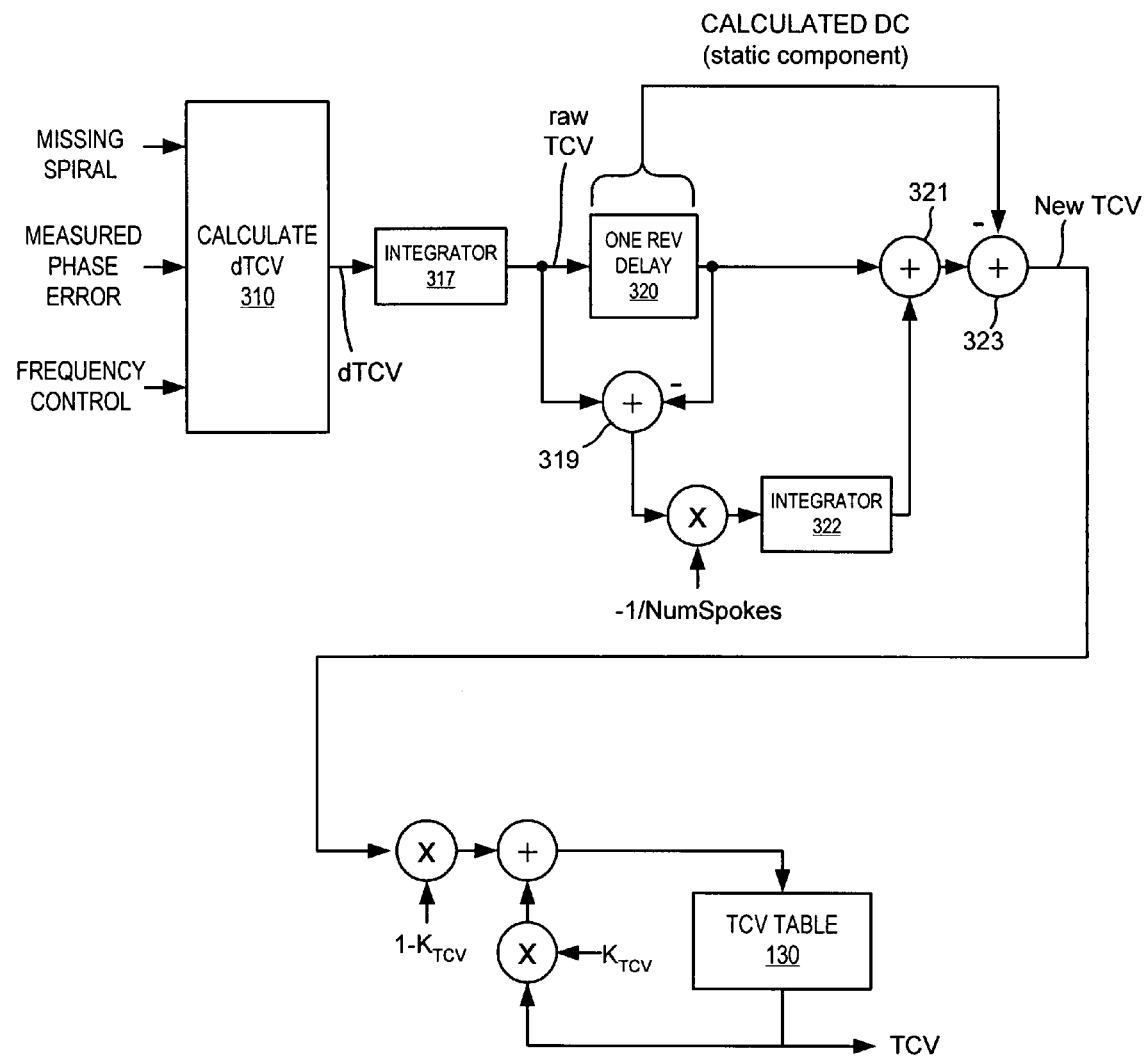

Systems/methods for reducing DC offset according to further embodiments are illustrated in FIG. 10. As shown therein, missing spiral data, measured phase error data and frequency control data are used to calculate dTCV values (Block 310). The dTCV values as then integrated in an integrator 317 to provide an uncorrected (raw) TCV value. The raw TCV value is delayed, and the previous TCV value is subtracted from the current TCV value at a subtraction node 319 to provide a DC ramp calculation. The DC ramp value is divided by the number of spokes and subtracted from the TCV value at a combining node 321. The static DC offset in the TCV values is calculated once per revolution and subtracted directly from the TCV value at a combiner 323 to provide new DC-corrected TCV values that are filtered and stored in the TCV table 130, and used as provided above. Accordingly, both the average DC offset over a revolution and the first order rate of change (ramp) of DC offset may be corrected in some embodiments.

The implementation of DC correction systems/methods may affect the performance of the system. For example, it may be desirable to calculate the DC offset with rounding to reduce or avoid having a systematic-polarity residual DC value. Furthermore, it may be desirable to properly synchronize the timing of the DC value update with the data. In some embodiments, it may be desirable to scale up the frequency control data used in the DC calculation to have a smaller effective DC calculation error.

In addition to the foregoing systems/methods for addressing DC, it may be desirable to improve spindle speed control to reduce variations in spindle speed in each revolution. It will be appreciated that a constantly changing spindle speed may introduce constantly changing errors, which leads to constantly changing TCV values. In order to improve spindle speed control, it may be desirable to reduce the control update rate for spindle speed control to once per revolution. It may also be desirable to reduce the loop bandwidth for the spindle control update loop. The digital to analog conversion control may also be dithered to obtain sub-LSB (least significant bit) control over the spindle speed.

Despite the additional complications introduced by the DC removal systems/methods illustrated in FIGS. 9 and 10, the resulting system is still much less complicated than a convolution-based system. Even where DC is removed, only a few more operations per spiral is required. Furthermore, the tables used for DC removal can be stored in slower (e.g. non-tightly coupled) memory, because only one value may need to be stored/retrieved per spiral Although some embodiments have been described with respect to the writing of servo fields using spiral reference patterns, it will be appreciated that embodiments may be used to write servo fields using other types of timing reference patterns besides spirals.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method for writing servo fields on a rotatable data storage disk using a phase locked loop that uses a phase error signal and a frequency control signal to control a phase of a clock signal generated by the phase locked loop, the method comprising:
   generating a timing control value in response to the phase error signal and the frequency control signal;
   adjusting the phase error signal in response to the generated timing control value by subtracting the timing control value from the phase error signal;
   generating a reference pattern signal in response to reference patterns on a surface of the data storage disk; generating the phase error signal in response to a phase offset between the clock signal and the reference pattern signal;
   generating a frequency control signal in response to the adjusted phase error; and
   adjusting the frequency of the clock signal in response to the frequency control signal.

2. The method of claim 1, wherein the timing control value comprises an average timing control value, the method further comprising averaging the generated timing control value with a timing control value selected from a table of timing control values.

3. The method of claim 1, wherein generating the timing control value comprises delaying the phase error signal, delaying the frequency control signal, and adding a current frequency control signal to the delayed phase error signal and the delayed frequency control signal to obtain a phase error estimate.

4. The method of claim 3, further comprising subtracting the phase error estimate from the phase error signal to obtain a differential timing control value.

5. The method of claim 4, further comprising integrating the differential timing control value to obtain the timing control value.

6. The method of claim 5, wherein if a reference pattern on the disk is missed, the differential timing control value associated with the missed reference pattern is set to zero.

7. The method of claim 6, wherein an expected phase error associated with the missed reference pattern is calculated in response to a phase error for a previous reference pattern and frequency control signals associated with previous reference patterns.

8. The method of claim 5, wherein if a reference pattern on the disk is missed, generating a differential timing control value associated with the missed reference pattern is deferred until a subsequent reference pattern is detected on the disk.

9. The method of claim 1, further comprising reducing DC offset in the timing control value.

10. The method of claim 9, wherein generating the timing control value comprises generating a differential timing control value in response to the phase error signal and the frequency control signal and integrating the differential timing control value, the method further comprising:
    measuring DC offset in the timing control value;
    dividing the DC offset by a number of spokes on the disk to obtain an average DC offset; and
    subtracting the average DC offset from the differential timing control value.

11. The method of claim 10, further comprising:
    delaying the frequency control signal;
    calculating a DC component of the frequency control signal over one disk revolution; and
    subtracting the DC component from the frequency control signal to provide a DC-compensated frequency control signal;
    wherein generating differential timing control value comprises generating differential timing control value in response the DC-compensated frequency control signal.

12. The method of claim 9, wherein generating the timing control value comprises generating differential timing control value in response to the phase error signal and the frequency control signal and integrating the differential timing control value, the method further comprising:
    delaying the generated timing control value;
    subtracting the delayed timing control value from a current timing control value to obtain a DC ramp value;
    dividing the DC ramp value by a number of spokes on the disk to obtain an average DC ramp; and
    subtracting the average DC ramp from the delayed timing control value.

13. The method of claim 12, further comprising:
    calculating a DC offset value over one disk revolution; and
    subtracting the DC offset value from the delayed timing control value.

14. An apparatus for writing servo fields on a data storage media, comprising:
    a phase locked loop including a clock generator that generates a clock signal, a phase demodulator that generates a phase error signal in response to the clock signal and a reference pattern read signal, a combiner that subtracts a timing control value from the phase error signal to provide an adjusted phase error signal, and a controller that generates a frequency control signal in response to the adjusted phase error signal; and
    a servo controller that generates the timing control value in response to the phase error signal and the frequency control signal; that delays the phase error final; that delays the frequency control signal; and that adds a current frequency control signal to the delayed phase error signal the delayed frequency control signal to obtain a phase error estimate.

15. The apparatus of claim 14, wherein the timing control value comprises an average timing control value, and wherein the servo controller is further configured to average the generated timing control value with a timing control value stored in a table of timing control values.

16. The apparatus of claim 14, wherein the servo controller is further configured to subtract the phase error estimate from the phase error signal to obtain a differential timing control value, and to integrate the differential timing control value to obtain the timing control value.

17. A method of reducing DC offset in a timing control value used to adjust a phase error signal in a phase locked loop for writing servo fields on a rotatable data storage disk using reference patterns on the data storage disk; the method comprising:
- generating a clock signal,
- reading a reference pattern signal;
- generating the phase error signal in response to a phase offset between the clock signal and the reference pattern signal;
- subtracting a timing control value from the phase error to provide an adjusted phase error;
- generating a frequency control signal in response to the adjusted phase error;
- generating a differential timing control value that is indicative of a timing error in the reference pattern signal in response to the phase error signal and the frequency control signal;
- integrating the differential timing control value to obtain the timing control value;
- measuring DC offset in the timing control value;
- obtaining an average DC offset from the DC offset; and
- subtracting the average DC offset from the differential timing control value.

* * * * *